United States Patent
Tang et al.

(10) Patent No.: US 9,483,147 B2
(45) Date of Patent: Nov. 1, 2016

(54) MONOLAYER TOUCH SCREEN AND METHOD FOR MANUFACTURING THE SAME

(71) Applicant: SHENZHEN O-FILM TECH CO., LTD, Shenzhen (CN)

(72) Inventors: Genchu Tang, Shenzhen (CN); Shengcai Dong, Shenzhen (CN); Wei Liu, Shenzhen (CN); Bin Tang, Shenzhen (CN)

(73) Assignee: Shenzhen O-Film Tech Co., Ltd., Shenzhen (CN)

( * ) Notice: Subject to any disclaimer, the term of this patent is extended or adjusted under 35 U.S.C. 154(b) by 41 days.

(21) Appl. No.: 13/968,325

(22) Filed: Aug. 15, 2013

(65) Prior Publication Data

US 2014/0295127 A1    Oct. 2, 2014

Related U.S. Application Data

(63) Continuation of application No. PCT/CN2013/079163, filed on Jul. 10, 2013.

(30) Foreign Application Priority Data

Mar. 30, 2013    (CN) .......................... 2013 1 0109658

(51) Int. Cl.
*G06F 3/041*    (2006.01)
*B32B 3/30*    (2006.01)
(Continued)

(52) U.S. Cl.
CPC ..... *G06F 3/044* (2013.01); *G06F 2203/04103* (2013.01); *Y10T 156/1039* (2015.01); *Y10T 428/22* (2015.01)

(58) Field of Classification Search
CPC .... G06F 3/041; G06F 3/0412; G06F 3/0414; G06F 2203/04804; G06F 2203/04112; G06F 3/044; B32B 17/064; B32B 3/30

USPC ................. 428/166, 172, 201, 426, 67, 213; 345/173, 174

See application file for complete search history.

(56) References Cited

U.S. PATENT DOCUMENTS

| | | | | |
|---|---|---|---|---|
| 8,383,014 B2* | 2/2013 | Vanheusden | ............. | H01B 1/22 252/512 |
| 2005/0083307 A1* | 4/2005 | Aufderheide et al. | ........ | 345/173 |

(Continued)

FOREIGN PATENT DOCUMENTS

| | | |
|---|---|---|
| CN | 101883478 A | 11/2010 |
| CN | 101893954 A | 11/2010 |

(Continued)

OTHER PUBLICATIONS

Chinese International Search Report of corresponding International PCT Application No. PCT/CN2013/079163, dated Jan. 9, 2014.

(Continued)

*Primary Examiner* — Maria Veronica Ewald
*Assistant Examiner* — Joanna Pleszczynska
(74) *Attorney, Agent, or Firm* — Hodgson Russ LLP

(57) ABSTRACT

Disclosed is a monolayer touch screen, which comprises: a transparent cover glass; a transparent emboss adhesive layer coated on a surface of the transparent cover glass, wherein the transparent emboss adhesive layer has multiple grooves that are located at non-visible region; a metallic mesh layer embedded in the transparent emboss adhesive layer, and the metallic mesh layer are located at a visible region; a hairline finishing layer deposited on the surface of the multiple grooves; and an ink layer coated on the hairline finishing layer. Hairline finishing layer of such monolayer touch screen deposits directly on the surface of multiple grooves of transparent emboss adhesive layer, compared to the traditional touch screen, such monolayer touch screen is thinner and has a hairline finishing effect. Also disclosed is a method for manufacturing the monolayer touch screen.

9 Claims, 4 Drawing Sheets

(51) Int. Cl.
   *B32B 17/06*   (2006.01)
   *G06F 3/044*   (2006.01)

(56) References Cited

U.S. PATENT DOCUMENTS

| | | | |
|---|---|---|---|
| 2006/0231818 A1 | 10/2006 | Lube | 256/12.5 |
| 2011/0057893 A1* | 3/2011 | Kim et al. | 345/173 |
| 2011/0109562 A1* | 5/2011 | Lin | 345/173 |
| 2011/0171433 A1* | 7/2011 | Lee et al. | 428/172 |
| 2012/0097424 A1* | 4/2012 | Jo et al. | 174/126.4 |

FOREIGN PATENT DOCUMENTS

| | | |
|---|---|---|
| CN | 102236445 A | 11/2011 |
| CN | 202422057 U | 9/2012 |
| CN | 102712518 A | 10/2012 |
| CN | 102929472 A | 2/2013 |
| CN | 203178974 U | 9/2013 |
| JP | 2009-67004 A | 4/2009 |
| JP | 4964073 B2 | 6/2012 |
| KR | 10-0591463 B1 | 6/2006 |
| KR | 10-2012-0014302 A | 2/2012 |
| KR | 10-1174709 B1 | 8/2012 |
| TW | M286775 | 2/2006 |

OTHER PUBLICATIONS

Chinese First Examination Report of corresponding China Application No. 201310109658.1, dated Mar. 5, 2014.
Korean Examination Report of corresponding Republic of Korea patent application No. 10-2013-7026489, dated Sep. 30, 2014.

* cited by examiner

MONOLAYER TOUCH SCREEN AND METHOD FOR MANUFACTURING THE SAME

CROSS-REFERENCE TO RELATED APPLICATIONS

This application is a continuation of International Application No. PCT/CN2013/079163, filed on Jul. 10, 2013, which claims the priority benefit of Chinese Patent Application No. 201310109658.1, filed on Mar. 30, 2013. The contents of the above identified applications are incorporated herein by reference in their entirety.

FIELD OF THE TECHNOLOGY

The present invention relates to the field of photoelectricity, and particularly to a monolayer touch screen and a method for manufacturing the same.

BACKGROUND

Touch screens are inductive devices able to receive input signals of touching. Touch screens endow information interaction with a new outlook, and are very attractive new information interaction device. The development of touch screen technology has attracted extensive attention of the domestic and international information medias, and touch screen technology has become a rapidly rising booming high technology industry in photoelectricity field.

Based on the transparency of various regions of a touch screen, the region of a touch screen coated with an ink layer may be called non-visible region, other region not coated with an ink layer may be called visible region. The operation inductive region of a touch screen is usually arranged at the visible region.

At present, ITO layer is a crucial component in a touch screen module. Although the manufacture technology of touch screens is developing rapidly, the basic manufacturing process of an ITO layer has not changed much in recent years, for example, in manufacture of projection capacitive screens. ITO coating film and ITO patterning are inevitably needed. The traditional OGS (One Glass Solution) technology adopts the process of plating ITO on glass, etching the plated ITO to obtain a desired sensor pattern in X,Y directions, and lastly proceeding with bridging with MoAlMo or ITO.

With the development in science and technology, the manufacturers of touch screens try to attract people's attention constantly, touch screens with hairline finishing effect show the effect of a noble and metal-like texture, and make the products more ornamental.

At present, touch screens with hairline finishing effect mainly adopt the process of bonding a film made with hairline finishing effect on one surface of a panel by binder or glue to obtain a touch screen with hairline finishing effect. However, compared to regular touch screens, an additional layer of film and binder are used, which increases the thickness of touch screens.

SUMMARY

Based on this, it is necessary to provide a thinner monolayer touch screen with wiredrawing line effect.

A monolayer touch screen comprises:
a transparent cover glass;
a transparent emboss adhesive layer coated on a surface of the transparent cover glass, wherein the transparent emboss adhesive layer has multiple grooves that are located at a non-visible region;
a metallic mesh layer embedded in the transparent emboss adhesive layer and located at a visible region;
a wiredrawing layer deposited on a surface of the multiple grooves; and
an ink layer coated on the wiredrawing layer.

In an embodiment, a material of the metallic mesh layer is one of gold, silver, copper, aluminum and zinc, or alloy containing at least two of these metals.

In an embodiment, the metallic mesh layer is constituted by metallic gridlines with a width of 0.2 μm-5 μm and a thickness of 1 μm-10 μm, a distance between adjacent metallic gridlines is 50 μm-500 μm.

In an embodiment, the depth of the grooves is 1 μm-5 μm, a width of the grooves is 1 μm-5 μm, a distance between adjacent grooves is 50 μm-500 μm, a multiple grooves are parallel or cross each other.

In an embodiment, a thickness of the wiredrawing layer is 0.1 nm-30 nm.

In an embodiment, a material of the wiredrawing layer is one of tin, silver and aluminum, or alloy of any two of these metals.

In an embodiment, a material of the ink layer is epoxy resin ink or PMMA ink, a thickness of the ink layer is 5 μm-50 μm.

A method for manufacturing a monolayer touch screen, comprises the following steps:
providing a transparent cover glass, and carrying on surface treatment to a surface of the transparent cover glass;
coating an emboss adhesive on the treated surface of the transparent cover glass to form a transparent emboss adhesive layer;
embossing the transparent emboss adhesive layer to form multiple grooves for depositing a wiredrawing layer, wherein the multiple grooves are located at a non-visible region;
forming a metallic mesh layer on the transparent emboss adhesive layer, wherein the metallic mesh layer is located at a visible region;
covering the metallic mesh layer with peelable glue, then depositing a non-conductive metallic layer on the peelable glue and the multiple grooves by using non conductive vacuum metallization, and lastly removing the peelable glue, the non-conductive metallic layer deposited on the surface of the multiple grooves is the wiredrawing layer;
coating an ink on the wiredrawing layer to form an ink layer.

In an embodiment, the step of forming the metallic mesh layer is:
embossing the transparent emboss adhesive layer to form mesh grooves for embedding a metallic mesh layer, the mesh grooves being located at the visible region, filling a photoresist in the multiple grooves, and filling a conductive material in the mesh grooves, then removing the photoresist, the conductive material filled in the mesh grooves forming the metallic mesh layer embedded in the transparent emboss adhesive layer.

In an embodiment, the multiple grooves and mesh grooves are obtained by the following process:
embossing the transparent emboss adhesive layer with a template having a pattern corresponding to the multiple grooves and the mesh grooves to form the multiple grooves and mesh grooves on the transparent emboss adhesive layer, wherein the multiple grooves are located at the non-visible region, the mesh grooves are located at the visible region.

Wiredrawing layer of such monolayer touch screen deposits directly on the surface of multiple grooves of transparent emboss adhesive layer, compared to the traditional touch screen with wiredrawing line effect obtained by means of bonding the film made with wiredrawing line effect on the surface of a panel by binder or glue, no additional layer of film and binder is used, thus such monolayer touch screen is thinner and has a wiredrawing line effect.

DETAILED DESCRIPTION

In order to make the objects, features and advantages of the present invention clearer, the following describes embodiments of the present invention in details with reference to accompanying drawings. Details are described in the following description to facilitate the understanding of the present invention. However, the present invention can be implemented by ways other than those described herein, similar modifications can be made by those skilled in the art without departing from the spirit of the present invention, and the following disclosed embodiments are not intended to limit the present invention.

Figure 1:
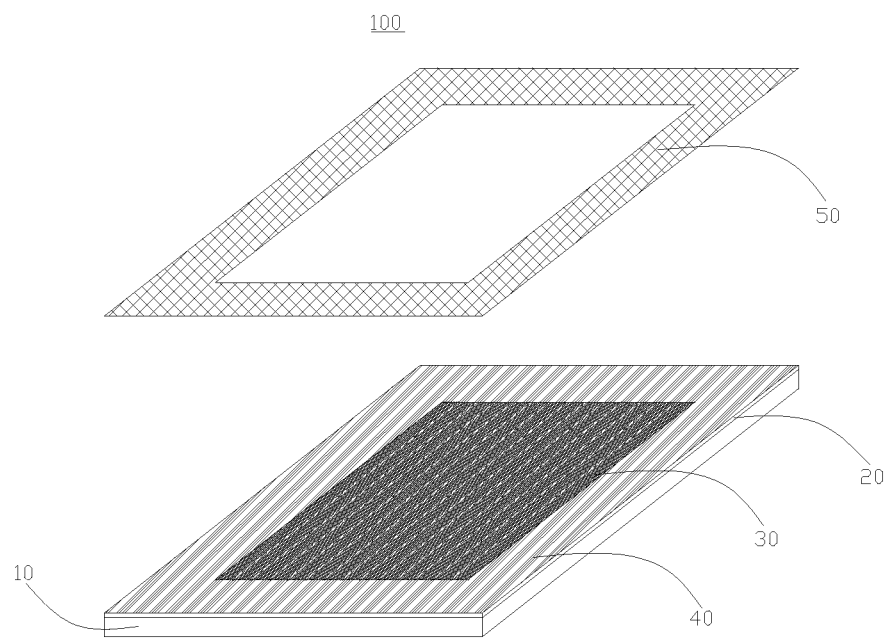
FIG. 1 is a schematic partial explosion view of a monolayer touch screen according to an embodiment.

A monolayer touch screen 100 according to an embodiment as shown in FIG. 1 includes: a transparent cover glass 10, a transparent emboss adhesive layer 20, a metallic mesh layer 30, a hairline finishing layer 40, and an ink layer 50 coated on the hairline finishing layer 40.

Figure 2:
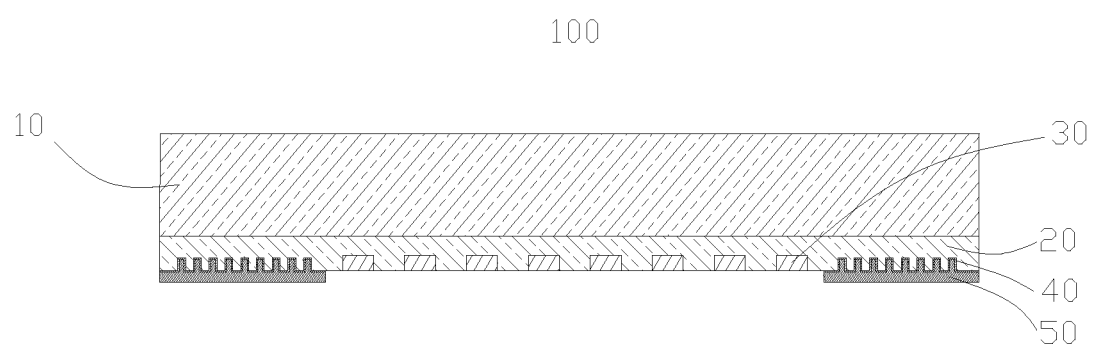
FIG. 2 is a cross-sectional view of the monolayer touch screen shown in FIG. 1.

Refer to FIG. 2, the transparent emboss adhesive layer 20 is coated on the surface of the transparent cover glass 10, the metallic mesh layer 30 is embedded in the transparent emboss adhesive layer 20 and located at a visible region.

Figure 3:
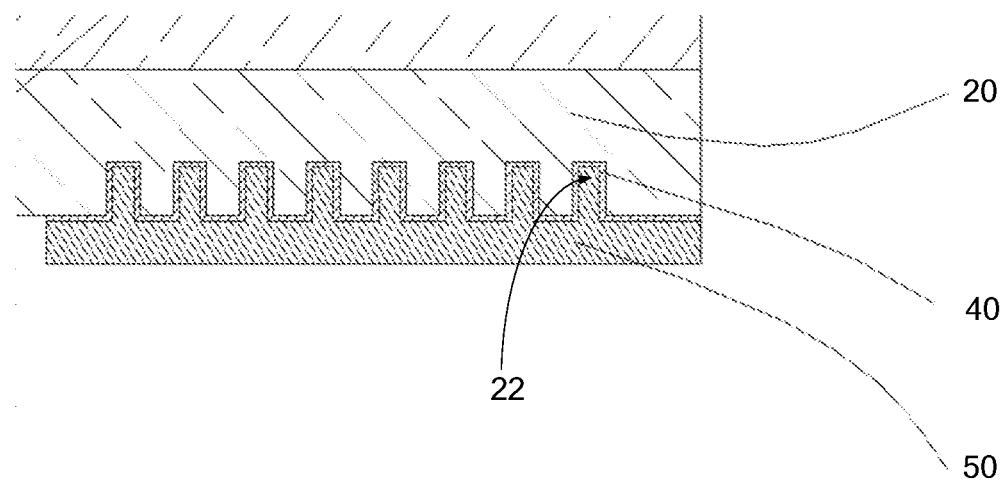
FIG. 3 is a partial enlarging view of the monolayer touch screen shown in FIG. 2.

Refer to FIG. 3, multiple grooves 22 are formed on the transparent emboss adhesive layer 20 and located at a non-visible region, the wiredrawing layer 40 is deposited on the surface of the multiple grooves 22.

The depth of the grooves 22 is 1 μm-5 μm, the width of the grooves 22 is 1 μm-5 μm, the distance between adjacent grooves 22 is 50 μm-500 μm, the multiple grooves 22 are parallel to or intersect each other.

The transparent cover glass 10 may be a sheet of aluminosilicate glass or soda lime glass, the thickness of the transparent cover glass 10 may be 0.3 mm-1.2 mm.

In a preferred embodiment, the thickness of the transparent cover glass 10 is 0.5 mm-0.7 mm.

In the embodiment, the material of the transparent emboss adhesive layer 20 is UV-curable adhesive, in one embodiment, the material of the transparent emboss adhesive layer 20 is solvent-free UV-curable acrylic resin. In other embodiments, the UV-curable adhesive may be other ingredients generally comprising prepolymer, monomer, photoinitiator and auxiliary, the molar ratio of the components is 30-50%:40-60%:1-6%:0.2-1%. Wherein, the prepolymer is selected from: epoxy acrylate, urethane acrylate, polyether acrylate, polyester acrylate, acrylic resin and so on; the monomer is selected from: monofunctional, bifunctional and trifunctional, and multifunctional; the initiator is selected from: benzophenone, deoxybenzoin and so on; the auxiliary is optional, and generally used as a binder, often used auxiliary includes: hydroquinone, p-methoxyphenol, p-benzoquinone and 2,6-di-tert-butyl cresol and so on.

The material of the metallic mesh layer 30 can be one of gold, silver, copper, aluminum and zinc, or alloy containing at least two of these metals. Compared to the traditional touch screen, ITO is replaced by the metallic mesh layer, which assures light transmittance and electrical conductivity, at the same time, material cost is reduced, thus lowering the cost. In the embodiment, the material of the metallic mesh layer 30 is silver, which further assures electrical conductivity of the electrical conductive unit.

The metallic mesh layer 30 is formed by metallic gridlines, to satisfy visual transparency, the width of metallic gridlines may be 0.2 μm-5 μm, and the thickness of metallic gridlines may be 1 μm-10 μm, the distance between adjacent metallic gridlines is 50 μm-500 μm.

In a preferred embodiment, the width of metallic gridlines may be 0.5 μm-2 μm, and the thickness of metallic gridlines may be 2 μm-5 μm.

The metallic mesh layer 30 is embedded in the transparent emboss adhesive layer 20, the transparent emboss adhesive layer 20 and the metallic mesh layer 30 are both paved on one surface of the transparent cover glass 10.

Figure 4:
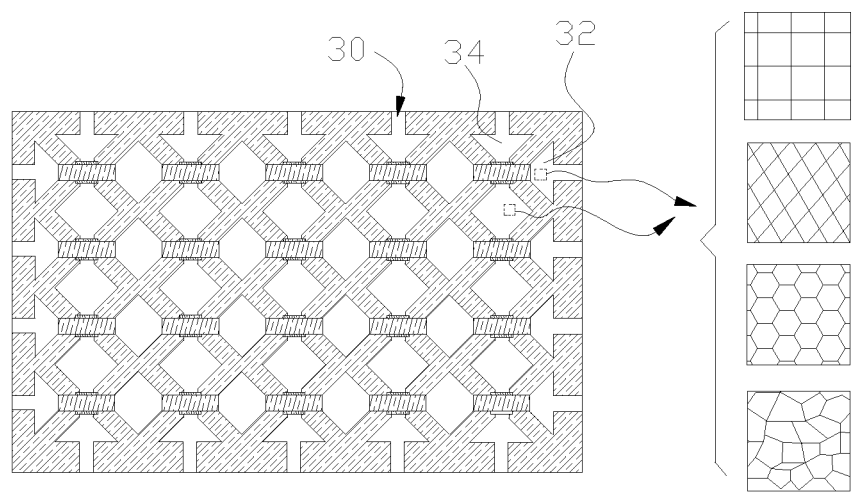
FIG. 4 is a schematic view of the metallic mesh layer and the metallic gridlines of a monolayer touch screen with a cross-bridge structure according to an embodiment.
Figure 5:
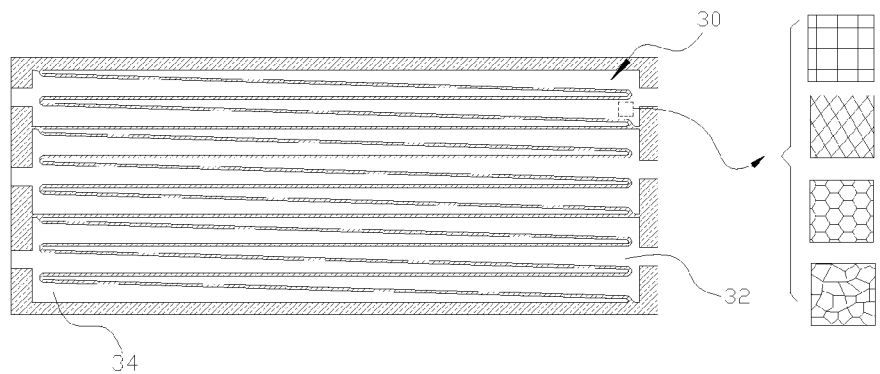
FIG. 5 is a schematic view of the metallic mesh layer and the metallic gridlines of a monolayer touch screen with a monolayer multiple-spot structure according to an embodiment.
Figure 6:
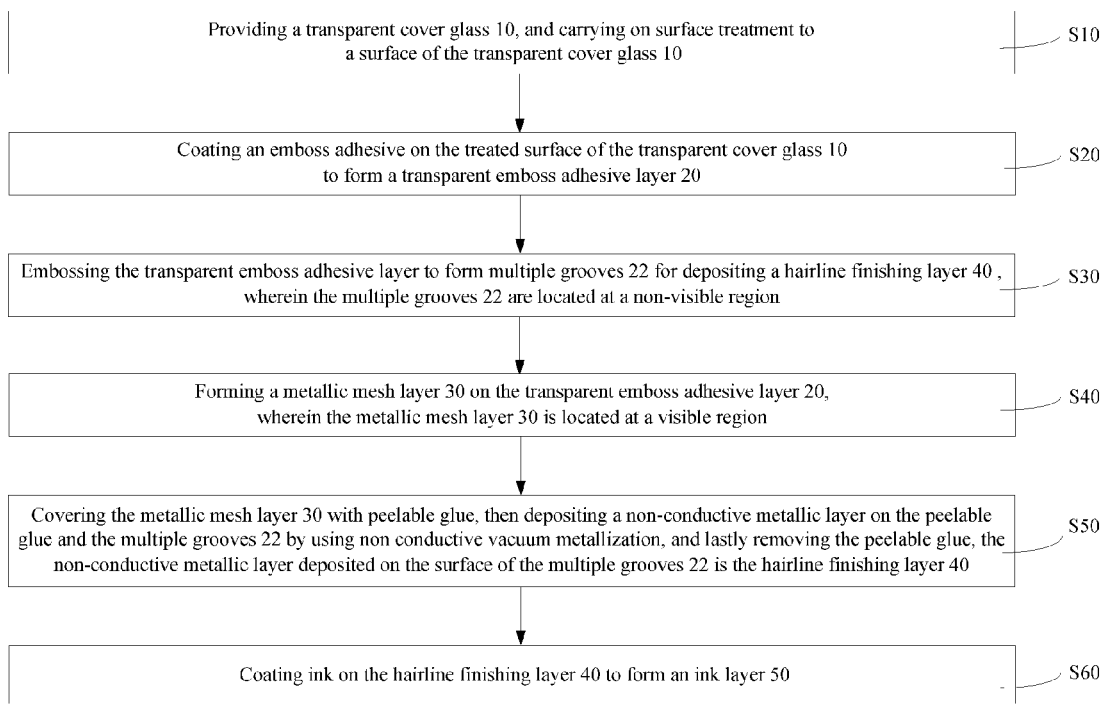
FIG. 6 is a flow chart of a manufacturing process of the monolayer touch screen shown in FIG. 1.

FIGS. 4 and 5 are schematic views of metallic mesh layer 30 and metallic gridlines of the monolayer touch screen according to two embodiments of the present invention. It can be seen from FIGS. 4 and 5 that the metallic mesh layer 30 is formed by metallic gridlines, the basic grid forming gridlines may be equilateral polygon, such as square, rhombus, regular hexagon and so on, or random grid patterns. The metallic mesh layer 30 comprises a first conductive group 32 and a second conductive group 34, the first conductive group 32 and the second conductive group 34 are inductive electrode and drive electrode, respectively. Refer to FIG. 4, the first conductive group 32 in the direction of X is the inductive electrode, the second conductive group 34 in the direction of Y is the drive electrode. Refer to FIG. 5, the first conductive group 32 on the right is the inductive electrode, the second conductive group 34 on the left is the drive electrode. The density and width of the gridlines of the first conductive group 32 and the second conductive group 34 may be the same or different.

The material of the hairline finishing layer 40 may be one of tin, silver and aluminum, or alloy of any two of these metals, and the thickness of the wiredrawing layer 40 is 0.1 nm-30 nm. In a preferred embodiment, the thickness of the hairline finishing layer 40 is 15 nm-25 nm. In the embodiment, the material of the hairline finishing layer 40 is tin.

The ink layer 50 serves the function of shielding, the material of the ink layer 50 may be epoxy resin ink or PMMA ink, and may be thermosetting type or UV-curable type.

The thickness of the ink layer 50 is 5 μm-50 μm, preferably 5 μm-20 μm.

Hairline finishing layer 40 of such monolayer touch screen 100 deposits directly on the surface of multiple grooves 22 of transparent emboss adhesive layer 20, compared to the traditional touch screen made with hairline finishing effect obtained by means of bonding the film with hairline finishing effect on the surface of the panel via a binder, no additional layer of film and binder is used, thus such monolayer touch screen is thinner and has a hairline finishing effect.

In addition, monolayer touch screen 100 with metallic mesh layer 30 can solve the problem of slow response of traditional large-scale touch screen caused by the large sheet resistance of ITO. At the same time, because the metallic mesh layer 30 is embedded in the transparent emboss adhesive layer 20, scratch of the metallic mesh layer 30 can be avoid.

The manufacturing process of the monolayer touch screen as shown in FIG. 6 and FIGS. 7a-7g comprises the following steps:

S10. Providing a transparent cover glass 10, and carrying on surface treatment to one surface of the transparent cover glass 10.

Figure 7:
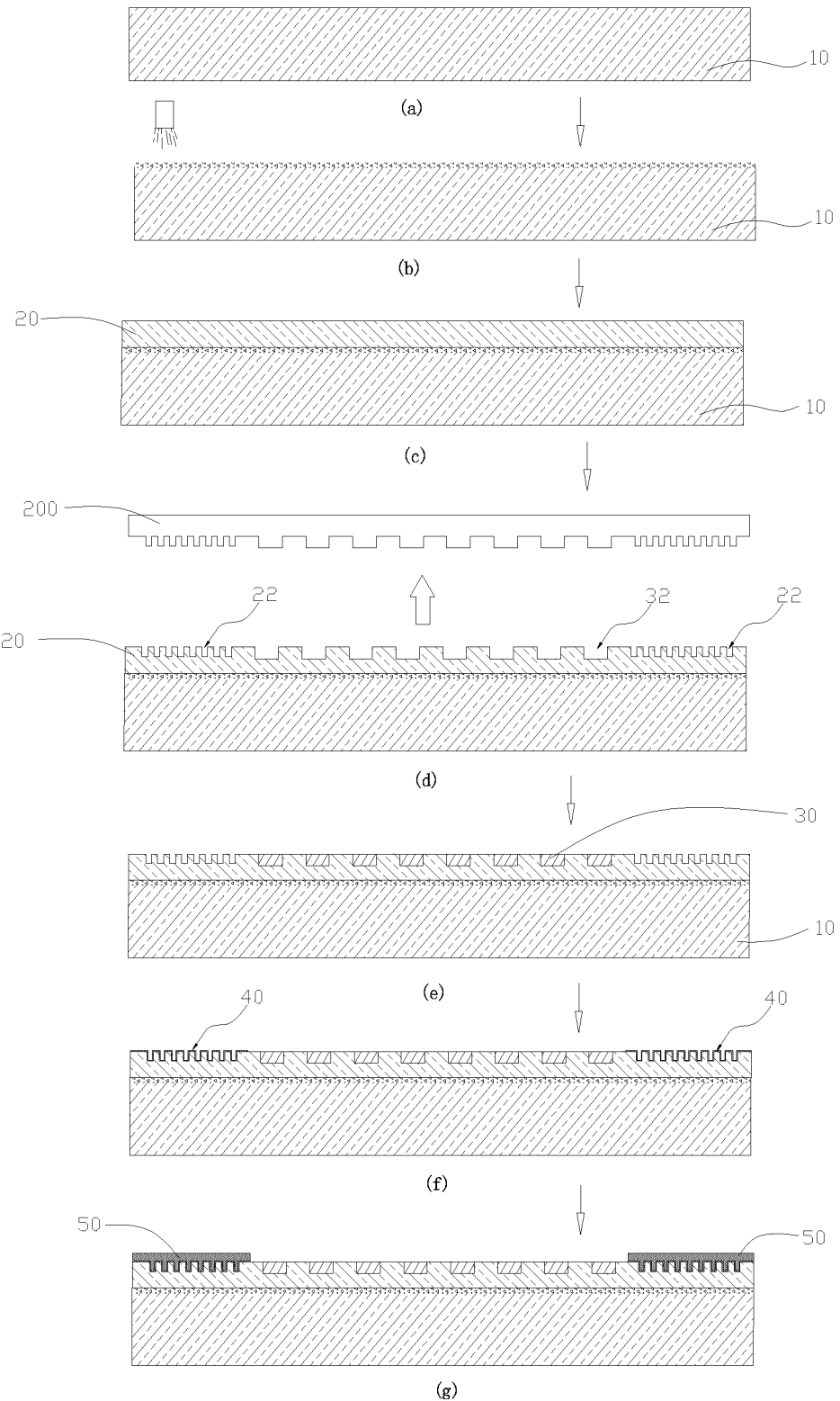
FIGS. 7a-7g are schematic views of various states of the monolayer touch screen shown in FIG. 1 in a manufacturing process.

Transparent cover glass 10 as shown in FIG. 7a is provided, and surface treatment to one surface of the transparent cover glass 10 is carried on, so as to obtain the transparent cover glass 10 as shown in FIG. 7b.

The transparent cover glass 10 may be a sheet of aluminosilicate glass or soda lime glass, the thickness of the transparent cover glass 10 may be 0.3 mm-1.2 mm.

In a preferred embodiment, the thickness of the transparent cover glass 10 is 0.5 mm-0.7 mm.

In the embodiment, the process of surface treatment is: carrying on a plasma treatment to one surface of the transparent cover glass 10 by using a plasma cleaning device, in order to enhance the adhesion force of the emboss adhesive with the glass. In the embodiment, the transparent cover glass 10 is aluminosilicate glass with a thickness of 0.7 mm.

S20. Coating an emboss adhesive on the treated surface of the transparent cover glass 10 to form a transparent emboss adhesive layer 20.

The emboss adhesive is coated on the treated surface of the transparent cover glass 10 to obtain the transparent cover glass 10 and the emboss adhesive layer 20 as shown in FIG. 7c.

The emboss adhesive is UV-curable adhesive, in one embodiment, the emboss adhesive is solvent-free UV-curable acrylic resin. In other embodiments, the UV-curable adhesive may be other ingredients generally comprising prepolymer, monomer, photoinitiator and auxiliary, the molar ratio of the components is 30-50%:40-60%:1-6%:0.2-1%. Wherein, the prepolymer is selected from: epoxy acrylate, urethane acrylate, polyether acrylate, polyester acrylate, acrylic resin and so on; the monomer is selected from: monofunctional, bifunctional and trifunctional and multifunctional; the initiator is selected from: benzophenone, deoxybenzoin and so on; the auxiliary is optional, and generally used as a binder, often used auxiliary includes: hydroquinone, p-methoxyphenol, p-benzoquinone and 2,6-di-tert-butyl cresol and so on. The thickness of the transparent emboss adhesive layer 20 is 1 μm-10 μm.

In a preferred embodiment, the thickness of the transparent emboss adhesive layer 20 is 2 μm-5 μm.

In the embodiment, UV-curable adhesive with a thickness of 5 μm is coated on the treated surface of the transparent cover glass 10 to form a transparent emboss adhesive layer 20.

S30. Embossing the transparent emboss adhesive layer to form multiple grooves 22 for depositing a hairline finishing layer 40, wherein the multiple grooves 22 are located at a non-visible region.

As shown in FIG. 7d, multiple grooves 22 are embossed on the transparent emboss adhesive layer 20.

The depth of the grooves 22 is 1 μm-5 μm, the width of the grooves is 1 μm-5 μm, the distance between adjacent grooves is 50 μm-500 μm, the multiple grooves are parallel or cross each other. Grooves 22 are formed by embossing, and may achieve the above depth, width and distance by adjusting embossing mould.

S40. Forming a metallic mesh layer 30 on the transparent emboss adhesive layer 20, wherein the metallic mesh layer 30 is located at a visible region.

The material of the metallic mesh layer 30 can be one of gold, silver, copper, aluminum and zinc, or alloy containing at least two of these metals. Compared to the traditional touch screen, ITO is replaced by the metallic mesh layer, which assures light transmittance and electrical conductivity, at the same time, material cost is reduced, and thus lowing the cost. In the embodiment, the material of the metallic mesh layer 30 is silver, which further assures electrical conductivity of the electrical conductive unit.

The metallic mesh layer 30 is formed by metallic gridlines, to satisfy visual transparecy, the width of metallic gridlines may be 0.2 μm-5 μm, and the thickness of metallic gridlines may be 1 μm-10 μm, the distance between adjacent metallic gridlines is 50 μm-500 μm.

In a preferred embodiment, the width of metallic gridlines may be 0.5 μm-2 μm, and the thickness of metallic gridlines may be 2 μm-5 μm.

The metallic mesh layer 30 is embedded in the transparent emboss adhesive layer 20, the transparent emboss adhesive layer 20 and the metallic mesh layer 30 are both paved on one surface of the transparent cover glass 10.

FIGS. 4 and 5 are schematic views of metallic mesh layer 30 and metallic gridlines of the monolayer touch screen according to two embodiments of the present invention. It can be seen from FIGS. 4 and 5 that the metallic mesh layer 30 is formed by metallic gridlines, the basic grid forming gridlines may be equilateral polygon, such as square, rhombus, regular hexagon and so on, or random grid patterns. The metallic mesh layer 30 comprises a first conductive group 32 and a second conductive group 34, the first conductive group 32 and the second conductive group 34 are inductive electrode and drive electrode respectively. Refer to FIG. 4, the first conductive group 32 in the direction of X is the inductive electrode, the second conductive group 34 in the direction of Y is the drive electrode. Refer to FIG. 5, the first conductive group 32 on the right is the inductive electrode, the second conductive group 34 on the left is the drive electrode. The density and width of the gridlines of the first conductive group 32 and the second conductive group 34 may be the same or different.

Refer to FIGS. 7d and 7e, in S40, the step of forming a metallic mesh layer 30 is:

embossing the transparent emboss adhesive layer to form mesh grooves 32 for embedding a metallic mesh layer, the mesh grooves 32 being located at the visible region, filling a photo-resist in the multiple grooves 22, and filling a conductive material in the mesh grooves 32, then removing the photo-resist, the conductive material filled in the mesh grooves 32 forming the metallic mesh layer 30 embedded in the transparent emboss adhesive layer 20.

The conductive material may be one of gold, silver, copper, aluminum and zinc, or alloy containing at least two of these metals. In the embodiment, the material of the metallic mesh layer 30 is silver, which further assures electrical conductivity of the electrical conductive unit.

Photo-resist may be SU8 photo-resist. A photo-resist is filled in the multiple grooves 22 by means of screen printing.

Refer to FIG. 7d, in S30 and S40 of the embodiment, the multiple grooves 22 and mesh grooves 32 may be obtained by the following process:

embossing the transparent emboss adhesive layer 20 with a template 200 having a pattern corresponding to the multiple grooves 22 and the mesh grooves 32, the multiple grooves 22 are located at the non-visible region, the mesh grooves 32 are located at the visible region.

Embossing the multiple grooves 22 and mesh grooves 32 at the same time with one template 200, the process of which is simple, and may increase efficiency and reduce cost of the template 200.

S50. Covering the metallic mesh layer 30 with peelable glue, then depositing a non-conductive metallic layer on the peelable glue and the multiple grooves 22 by using non conductive vacuum metallization, and lastly removing the peelable glue, the non-conductive metallic layer deposited on the surface of the multiple grooves 22 is the hairline finishing layer 40.

The material of the hairline finishing layer 40 may be one of tin, silver and aluminum, or alloy of any two of these metals, and the thickness of the hairline finishing layer 40 is 0.1 nm-30 nm. In a preferred embodiment, the thickness of the hairline finishing layer is 15 nm-25 nm. In the embodiment, the material of the hairline finishing layer 40 is tin.

Silver has the best silver white effect and conductive performance of all metals, however, it is not conductive when the thickness is less than 5 nm. It is because when metal is nano-scale, take Ag for example, if the thickness of coating is less than 5 nm, there is separated, discontinuous distributed nano-particles in the Ag coating, without interconnection or conduction, but with the color. Similarly, tin with the thickness of less than 30 nm has pretty poor continuity, but silver white metallic luster and large resistance may be obtained.

The peelable glue may be polyvinyl butyral of UV type peelable blue glue.

Refer to FIG. 7f, deposit the hairline finishing layer 40 on the multiple grooves 22 via non conductive vacuum metallization(NCVM), and the deposited region of the hairline finishing layer 40 is the non-visible region.

S60. Coating ink on the hairline finishing layer 40 to form an ink layer 50.

Refer to FIG. 7g, the cured ink forms the ink layer 50.

The ink layer 50 serves the function of shielding, the material of the ink layer 50 may be epoxy resin ink or PMMA ink, and may be thermosetting type or UV-curable type.

The thickness of the ink layer 50 is 5 μm-50 μm, preferably 5 μm-20 μm.

The monolayer touch screen 100 manufactured by the process has a metallic gridlines structure, which may be manufactured by emboss process, compared to the process of using ITO as the conductive layer, the metallic gridlines structure can be formed in one step, the process is simple and without expensive devices of sputtering, evaporation and so on, and the process can obtain high yield rate and is suitable for extended volume production. Meanwhile, waste of the material of conductive layer won't happen for not using etching process.

The above embodiments only represent several implementations of the present invention, which is specific and detailed, but not intended to limit the scope of the present invention. It should be noted that various modifications and changes can be made by those skilled in the art without departing from the scope of the present invention and covered in the claims of the present invention. Therefore the scope of the present invention is subject to the claims attached.

What is claimed is:

1. A monolayer touch screen, comprising:
   a transparent cover glass;
   a transparent emboss adhesive layer coated on a surface of the transparent cover glass, wherein the transparent emboss adhesive layer has multiple grooves that are located at a nonvisible region;
   a metallic mesh layer embedded in the transparent emboss adhesive layer and located at a visible region;
   a hairline finishing layer deposited on a surface of the multiple grooves, with a thickness of the hairline finishing layer being 0.1 nm-5 nm, a material of the hairline finishing layer being silver; and
   an ink layer coated on the hairline finishing layer;
   wherein the hairline finishing layer is a non-conductive silver layer,
   wherein the hairline finishing layer is formed with separated, discontinuously distributed nano-particles.

2. The monolayer touch screen according to claim 1, wherein a material of the metallic mesh layer is one of gold, silver, copper, aluminum and zinc, or alloy containing at least two of these metals.

3. The monolayer touch screen according to claim 1, wherein the metallic mesh layer is constituted by metallic gridlines with a width of 0.2 μm-5 μm and a thickness of 1 μm-10 μm, a distance between adjacent metallic gridlines is 50 μm-500 μm.

4. The monolayer touch screen according to claim 1, wherein a depth of the grooves is 1 μm-5 μm, a width of the grooves is 1 μm-5 μm, a distance between adjacent grooves is 50 μm-500 μm, the multiple grooves are parallel or cross each other.

5. The monolayer touch screen according to claim 1, wherein a material of the ink layer is epoxy resin ink or PMMA ink, a thickness of the ink layer is 5 μm-50 μm.

6. A monolayer touch screen, comprising:
   a transparent cover glass;
   a transparent emboss adhesive layer coated on a surface of the transparent cover glass, wherein the transparent emboss adhesive layer has multiple grooves that are located at a non-visible region;
   a metallic mesh layer embedded in the transparent emboss adhesive layer and located at a visible region;
   a hairline finishing layer conformally deposited on a surface of the multiple grooves and a surface of the transparent emboss adhesive layer at the non-visible region, wherein the hairline finishing layer is a non-conductive metallic layer having a thickness of 0.1 nm-5 nm, wherein a material of the hairline finishing layer is silver; and
   an ink layer coated on the hairline finishing layer,
   wherein the hairline finishing layer is formed with separated, discontinuously distributed nano-particles.

7. The monolayer touch screen according to claim 6, wherein the depth of the grooves is 1 μm-5 μm, a width of the grooves is 1 μm-5 μm, a distance between adjacent grooves is 50 μm-500 μm, the multiple grooves are parallel or cross each other.

8. The monolayer touch screen according to claim 6, wherein a material of the ink layer is epoxy resin ink or PMMA ink, a thickness of the ink layer is 5 μm-50 μm.

9. The monolayer touch screen according to claim 1, wherein the hairline finishing layer is conformally deposited on a surface of the multiple grooves and a surface of the transparent emboss adhesive layer at the non-visible region and does not fully fill the multiple grooves.

* * * * *